UNITED STATES PATENT OFFICE.

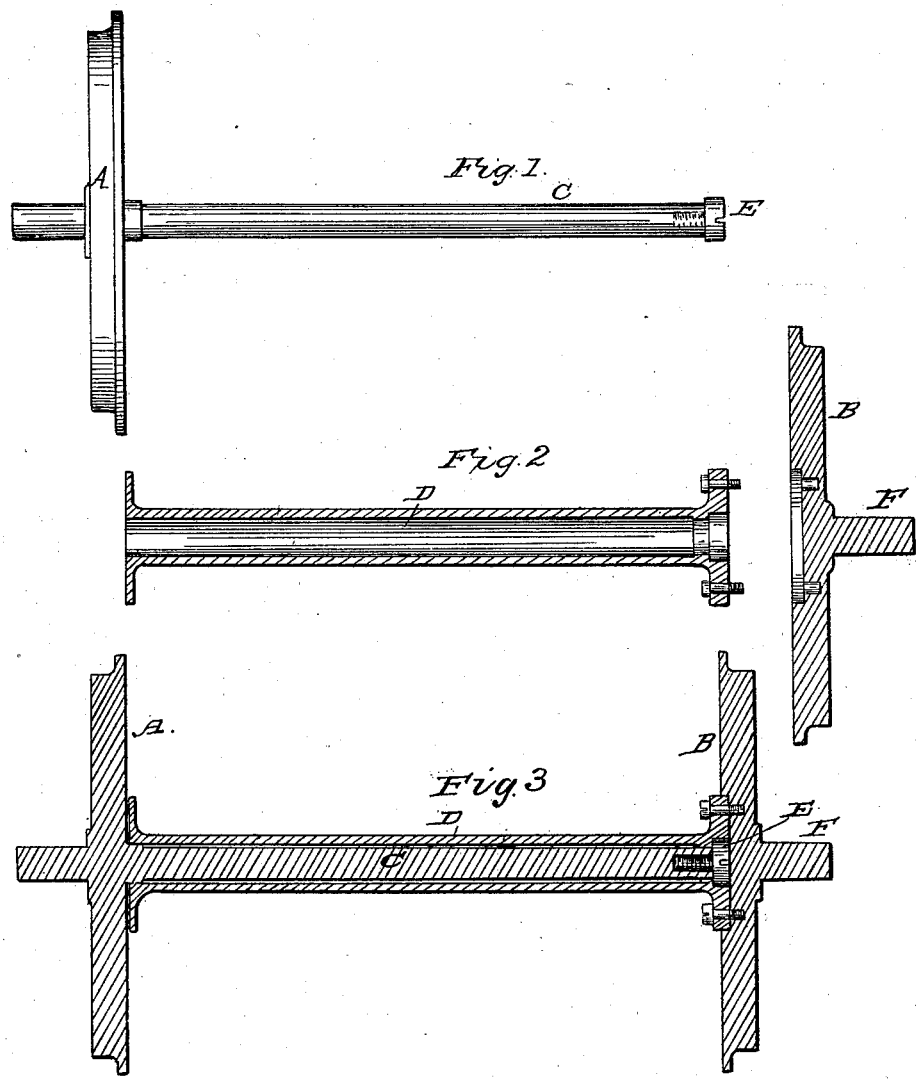

FREDERICK STURNEYK, OF ST. PAUL, MINNESOTA.

IMPROVEMENT IN RAILWAY-CAR AXLES.

Specification forming part of Letters Patent No. 106,635, dated August 23, 1870.

*To all whom it may concern:*

Be it known that I, FREDERICK STURNEYK, of St. Paul, in the county of Ramsey and State of Minnesota, have invented a new and useful Improvement in Railroad-Car Wheels and Axles; and I do hereby declare that the following is a full, clear, and exact description thereof, which will enable others skilled in the art to make and use the same, reference being had to the accompanying drawing, forming part of this specification.

Figure 1 is a side view of the inner axle and its attached wheel. Fig. 2 is a sectional view of the outer axle and the wheel to which it is to be secured. Fig. 3 is a detail sectional view of the entire device arranged for use.

Similar letters of reference indicate corresponding parts.

My invention relates to car-wheels having independent axles; and consists in an improved mode of attaching them together.

A and B represent the pair of wheels. The wheel A is formed upon, or is rigidly attached to, the inner axle, C, in the ordinary manner, so as to leave the outer end of said axle projecting to enter the journal-box of the truck. D is the outer axle, which is made tubular, and is placed over the axle C, and secured to it by the screw E, the head of which is made of a larger diameter than the axle C, and which is screwed into a screw-hole formed for it in the end of the said axle C, as shown in Figs. 1 and 2, the head of the said screw entering a recess formed for it in the end of the axle D. The screw E thus securely connects the two axles together, and prevents the wheels from spreading.

The adjacent surfaces of the axles C D are so formed that they will bear upon each other only in two points, as shown in Fig. 3. The wheel B is formed with a recess upon its inner side to receive the flanged end of the axle D, to which it is securely bolted, as shown in Figs. 2 and 3. The wheel B is formed with a journal, F, upon its outer side, to enter the journal-box of the truck.

By this construction, when the cars are passing around a curve, the outer wheel is free to revolve faster than the inner wheel, thus almost entirely overcoming the friction between the wheels and the rails of the track, the friction between the two axles C D, from their construction, being scarcely appreciable.

It will be observed that I have no design to claim the discovery that two wheels may be made to rotate independently of each other, and therefore at different velocities on a curve; nor do I desire to claim two independently-rotating shafts, one within the other, but simply two improved combinations of certain parts.

Having thus described my invention, I claim as new and desire to secure by Letters Patent—

The broad-headed screw E, combined with a cylindrical axle, C, and a surrounding tubular axle, D, as and for the purpose specified.

FREDERICK STURNEYK.

Witnesses:
GREENLEAF CLARK,
JAMES O'BRIEN.